United States Patent [19]

Burandt et al.

[11] Patent Number: 4,779,822
[45] Date of Patent: Oct. 25, 1988

[54] ACTUATOR SYSTEM

[75] Inventors: Wesley A. Burandt; Jeffrey D. Metcalf; Duane Wingate, all of Rockford, Ill.

[73] Assignee: Sundstrand Corporation, Rockford, Ill.

[21] Appl. No.: 866,366

[22] Filed: May 23, 1986

[51] Int. Cl.$^4$ .............................................. B64C 13/00
[52] U.S. Cl. .................................... 244/75 R; 244/213
[58] Field of Search ............... 244/215, 214, 213, 231, 244/75 R, 76 R; 74/665 R, 665 F, 674

[56] References Cited

U.S. PATENT DOCUMENTS

| 3,203,275 | 8/1965 | Hoover . | |
|---|---|---|---|
| 3,935,754 | 2/1976 | Comollo . | |
| 3,986,689 | 10/1976 | Maltby . | |
| 4,180,222 | 12/1979 | Thornburg . | |
| 4,256,277 | 3/1981 | Embree | 244/213 |
| 4,441,675 | 4/1984 | Boehringer et al. . | |
| 4,578,993 | 4/1986 | Burandt | 244/75 R |

FOREIGN PATENT DOCUMENTS 2126177 3/1984 United Kingdom ............. 244/75 R

OTHER PUBLICATIONS

Proposal E2998-P2, Technical Proposal from Sundstrand Aviation Mechanical to Northrop Corp., Mar. 6, 1985.

Primary Examiner—Joseph F. Peters, Jr.
Assistant Examiner—Rodney Corl
Attorney, Agent, or Firm—Wood, Dalton, Phillips, Mason & Rowe

[57] ABSTRACT

In order to protect an actuator system for a movable surface in a reliable manner, while also protecting the movable surface in the event of a system failure, the actuator system includes a power drive unit connected to one end of an input shaft. An actuator is disposed on the input shaft having multiple output stages normally driven by the power drive unit through the input shaft with the mutiple output stages being operatively associated with the movable surface for driving movement thereof. In order to provide dual load path shafting together with incorporating fail safe actuator construction, the actuator system also includes a feedback shaft extending from the actuator to the power drive unit and a torque sensor operatively associated with the feedback shaft.

16 Claims, 3 Drawing Sheets

ACTUATOR SYSTEM

FIELD OF THE INVENTION

The present invention relates to actuator systems and, more particularly, to an actuator system for control surfaces of an aircraft.

BACKGROUND OF THE INVENTION

Aircraft such as the ones commonly utilized in military applications are known to employ multiple stage geared rotary actuators. Such actuators are provided for positioning the leading edge flaps and/or the trailing edge flaps, but such actuators have an inherent failure mode that could fatigue the flight control panel of the aircraft if the inherent failure mode goes undetected. Moreover, if undetected, the fatigue resulting from failure in the multiple stage geared rotary actuators could ultimately result in loss of the flight control panel.

Conventionally, the geared rotary actuators are constructed to have multiple output stages each with a planetary gear set. Each planetary gear set includes a fixed ring gear and a ring gear connected to the flight control panel, and a failure is difficult to detect because the remaining output stages that can drive the flight control panel will back-drive an output stage through the panel being controlled. As a result, loading is introduced within the flight control panel which it is not designed to carry.

As will be appreciated, flight control panels have both aiding and opposing loads imposed upon them dependent upon the position of the panels. It is recognized as a good design practice to protect both the actuator system and the flight control panels, e.g., leading edge flaps, in the unlikely event of a torque tube failure which could eliminate the resisting or holding torque from a power drive unit that would normally resist aiding loads imposed upon the panel. For this purpose, various methods can be incorporated for such a failure, i.e., asymmetry brakes, zero back-driving actuators, dual load path shafting, etc.

Presently, it is an acceptable method to utilize dual load path shafting to multiple actuators per panel. Should a shaft or the internal construction of a geared rotary actuator fail open, then the flap panel must be held. Generally, the flap panel is held by the other load path to another actuator reacting to aiding loads on that flap panel.

In some military applications, aircraft design dictates that only one geared rotary actuator drive a single flap panel. Alternatively, multiple actuators are utilized in which only one actuator is sized to react to aiding loads on a flap panel. When a system is configured in this fashion, it is necessary to have dual load path shafting and also to incorporate fail safe construction for the actuator system.

The present invention is directed to overcoming the above stated problems and accomplishing the stated objects by providing an actuator system for control panels of an aircraft.

SUMMARY OF THE INVENTION

Accordingly, the present invention is directed to an actuator system for a movable surface such as a control panel of an aircraft. The system includes a power drive unit connected to one end of an input shaft. It also includes actuator, means disposed on the input shaft and having multiple output stages normally driven by the power drive unit through the input shaft with the multiple output stages being operatively associated with the surface for driving movement thereof. The system further includes a feedback shaft extending from the actuator means to the power drive unit. Additionally, the present invention utilizes torque sensing means in operatively associated relation to the feedback shaft.

In an exemplary embodiment, the input shaft is a torque tube and the actuator means is a geared rotary actuator. With this construction, the multiple output stages of the geared rotary actuator normally are driven by the power drive unit through the torque tube with the feedback shaft normally being subjected to a nominal torque. Moreover, the feedback shaft is subjected to a detectable increased torque in the event of a failure in the input shaft or the actuator means.

More specifically, the torque sensing means is preferably integrally associated with the power drive unit for sensing the increased torque of the feedback shaft. It will, therefore, be appreciated that the feedback shaft is joined to the power drive unit in such a manner that the torque sensing means is capable of detecting the increased torque. With these features, the system is capable of continuing in operation while also giving an indication of a failure in the input shaft or the geared rotary actuator.

In an exemplary embodiment, the actuator system is especially adapted for use with a pair of control surfaces for an aircraft. The system then includes first actuator means disposed on the input shaft in which the multiple output stages thereof are operatively associated with one of the control surfaces for driving movement thereof. The system also includes second actuator means disposed on the input shaft in which the multiple output stages thereof are operatively associated with the other of the control surfaces for driving movement thereof. With this construction, the feedback shaft extends between the power drive unit and the second actuator means in operatively associated relation.

Preferably, the geared rotary actuator comprising the first actuator means includes a simple planetary input stage at an end thereof joined to the power drive unit and a simple planetary output stage at an end thereof joined to the geared rotary actuator comprising the second actuator means. It is also contemplated that a pair of differential planetary stages will be disposed between the simple planetary input and output stages each of which comprises one of the multiple output stages of the first actuator means with the differential planetary stages each including an output gear operatively associated with one of the pair of control surfaces. Additionally, a torque limiter is preferably disposed at each end of the geared rotary actuator comprising the first actuator means and is adapted to limit torque transmitted through the torque tube by reason of being grounded to the aircraft through the geared rotary actuator.

Advantageously, the geared rotary actuator comprising the second actuator means includes a simple planetary input stage at an end thereof joined through the torque tube to the geared rotary actuator comprising the first actuator means. It is also contemplated that a pair of differential planetary stage will be disposed between the simple planetary input stage and the feedback shaft each of which comprise one of the multiple output stages of the second actuator means with each including an output gear operatively associated with the other of the pair of control surfaces. Additionally, a pair of simple planetary output stages are preferably provided at an end thereof joined to the feedback shaft such that the feedback shaft is joined to the outermost of the simple planetary output stages by a spur gear set.

In a preferred embodiment, the actuator system includes third actuator means disposed at the end of the input shaft remote from the power drive unit. The third actuator means has an output stage driven by the power drive unit through the input shaft with the output stage being operatively associated with the outer one of the pair of control surfaces for driving movement thereof. With this construction, the third actuator means also comprises a geared rotary actuator in which the output stage is driven by the power drive unit through the input shaft or torque tube.

Other objects, advantages and features of the present invention will become apparent from the following specification taken in conjunction with the accompanying drawings.

DETAILED DESCRIPTION OF THE PREFERRED EMBODIMENT

Figure 1:
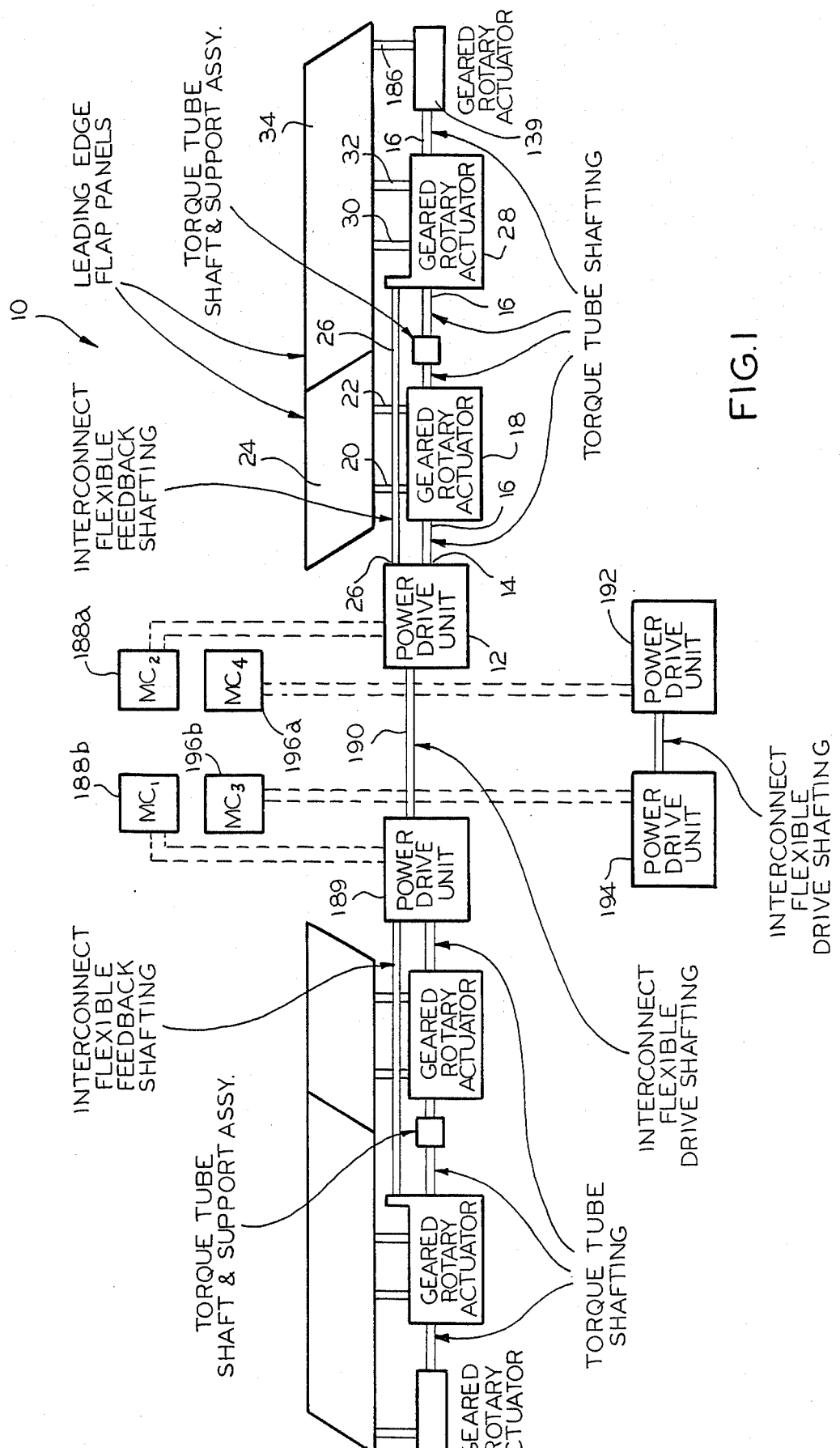
FIG. 1 is a block diagram illustrating an actuation system in accordance with the present invention.

An exemplary embodiment of an actuator system in accordance with the invention is illustrated in FIG. 1. The actuator system 10 includes a power drive unit 12 connected to one end 14 of an input shaft 16. It also includes actuator means 18 disposed on the input shaft 16 and having multiple output stages 20 and 22 normally driven by the power drive unit 12 through the input shaft 16 with the multiple output stages 20 and 22 being operatively associated with a movable surface such as the control surface or leading edge flap panel 24. The actuator system 10 further includes a feedback shaft 26 extending from the power drive unit 12. Additionally, the actuator system 10 includes torque sensing means operatively associated with the feedback shaft 26, as will be described in detail hereinafter.

Still referring to FIG. 1, the input shaft 16 is a torque tube and the actuator means 18 is a geared rotay actuator. The multiple output stages 20 and 22 of the geared rotary actuator 18 normally are driven by the power drive unit 12 through the torque tube 16. Moreover, the torque sensing means is integrally associated with the power drive unit 12.

With this construction, the feedback shaft 26 is normally subjected to a nominal torque. However, the feedback shaft 26 is subjected to a detectable increased torque in the event of a failure in the input shaft or torque tube 16 or in the actuator means or geared rotary actuator 18. Additionally, the feedback shaft 26 is joined to the power drive unit 12 such that the torque sensing means is capable of detecting the increase torque.

In the preferred embodiment, the torque tube 16 and the feedback shaft 26 extend from the power drive unit 12 in generally parallel relation to the leading edge flap panel 24, as shown in the block diagram of FIG. 1. In addition, the actuator system 10 includes both first actuator means or geared rotary actuator 18 and second actuator means or geared rotary actuator 28 both of which are disposed on the input shaft or torque tube 16 and both of which have multiple output stages 20 and 22, and 30 and 32, respectively, driven by the power drive unit 12 through the input shaft or torque tube 16. As will be appreciated, the multiple output stages 20 and 22 are operatively associated with one of a pair of control surfaces 24 for driving movement thereof and the multiple output stages 30 and 32 are operatively associated with the other of a pair of control surfaces 34 for driving movement thereof.

With the arrangement illustrated in FIG. 1, the feedback shaft 26 extends from the power drive unit 12 to the second actuator means or geared rotary actuator 28. It will also be appreciated that the feedback shaft 26 is operatively associated with the geared rotary actuator 28. With this arrangement, the feedback shaft 26 is subjected to an increased torque in the event of a failure in the torque tube 16 or in the first or second geared rotary actuators 18 or 28 with the increased torque being indicative of the failure.

Figure 2:
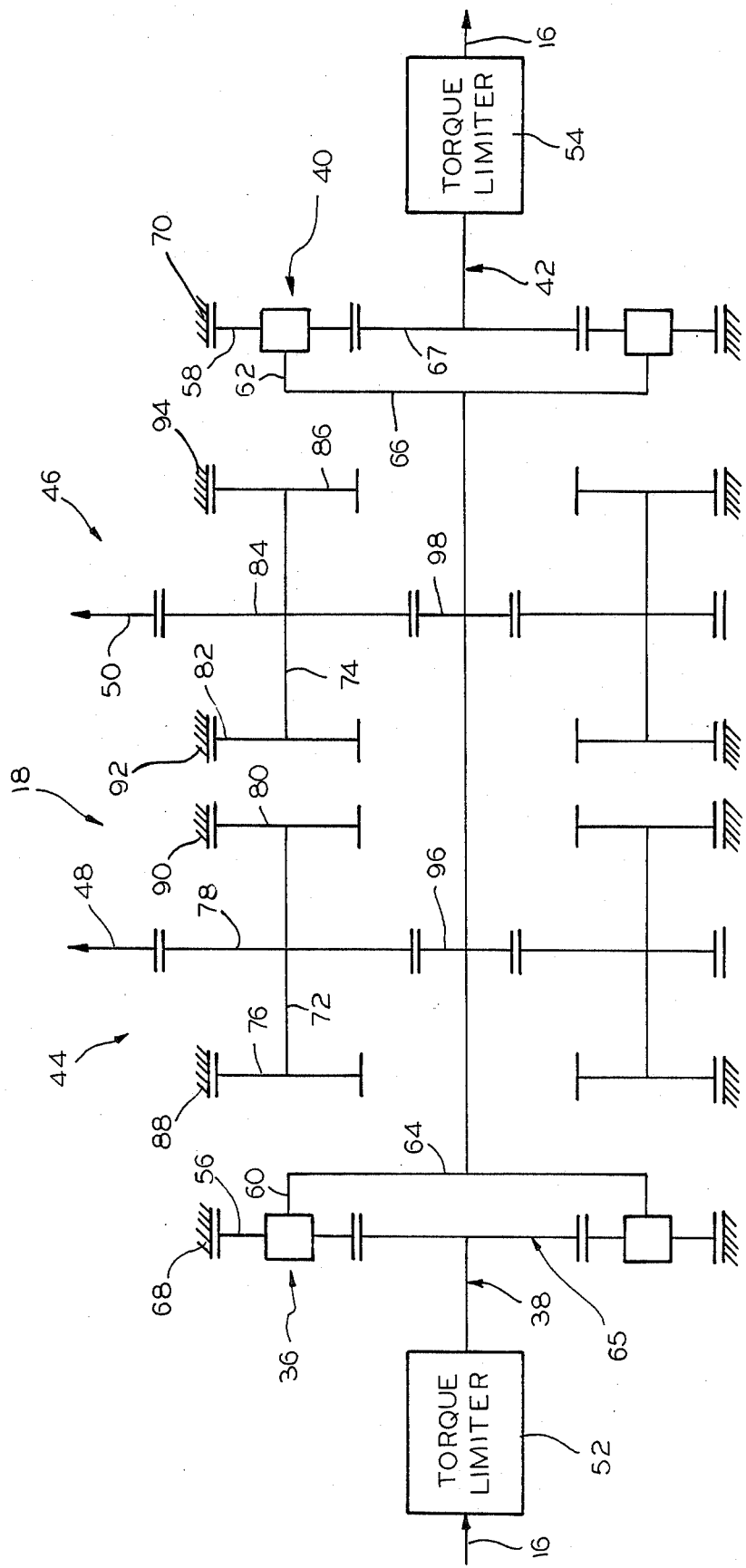
FIG. 2 is a schematic diagram of one geared rotary actuator for use in an actuation system of the type illustrated in FIG. 1.

Referring to the schematic illustration of FIG. 2, the geared rotary actuator 18 comprising the first actuator means is shown and includes a simple planetary input stage 36 at an end 38 thereof joined through the torque tube 16 to the power drive unit 12 and a simple planetary output stage 40 at an end 42 thereof joined through the torque tube 16 to the geared rotary actuator 28 comprising the second actuator means. It will also be seen that a pair of differential planetary stages 44 and 46 are disposed between the simple planetary input stage 36 and the simple planetary output stage 40 with each of the differential planetary stages 44 and 46 comprising one of the multiple output stages 20 and 22 of the first actuator means or geared rotary actuator 18, and the differential planetary stages 44 and 46 each include an integral mounting lug/output ring gear 48 and 50, respectively, associated with the one of the pair of control surfaces 24. Additionally, a torque limiter 52 and 54 is disposed at each end 38 and 42 of the geared rotary actuator 18 comprising the first actuator means with the torque limiters 52 and 54 being grounded to the aircraft comprising the first actuator means.

Still referring to FIG. 2, the simple planetary input stage 36 and the simple planetary output stage 40 each comprise three planet gears such as 56 and 58, respectively, mounted on needle bearings supported by through shafts 60 and 62, respectively, pressed into respective carriers 64 and 66. The planet gears, such as 56 and 58, react with sun gears 65 and 67, respectively, integral with the input shaft or torque tube 16 and with fixed ring gears 68 and 70. The differential planetary stages 44 and 46 each consist of six planet gear shafts, such as 72 and 74, each consisting of three gears, such as 76, 78, 80 and 82, 84, 86 cut on the respective shafts 72 and 74. The six planetary gear shafts, such as 72 and 74, are each supported by two support rings situated between the center planet gears 78 and 84 and the outer planet gears 76, 80 and 82, 86. As is conventional, the support rings (not shown) hold the planet gears 76, 80 and 82, 86 closely in mesh with the fixed ring gears 88, 90 and 92, 94 to allow control of actuator output backlash.

As will be appreciated, the outer planet gears, such as 76, 80 and 82, 86, mesh with the fixed ring gears 88, 90 and 92, 94. It will also be appreciated that the ring gears 88, 90 and 92, 94, as with the ring gears 68, 70, are fixed, i.e., attached to the aircraft structure through the housing of the geared rotary actuator 18 Moreover, the center planet gears 78 and 84 mesh with sun gears 96, 98 and with output ring gears 48, 50 attached to the control surface or flap panel 24.

Figure 3:
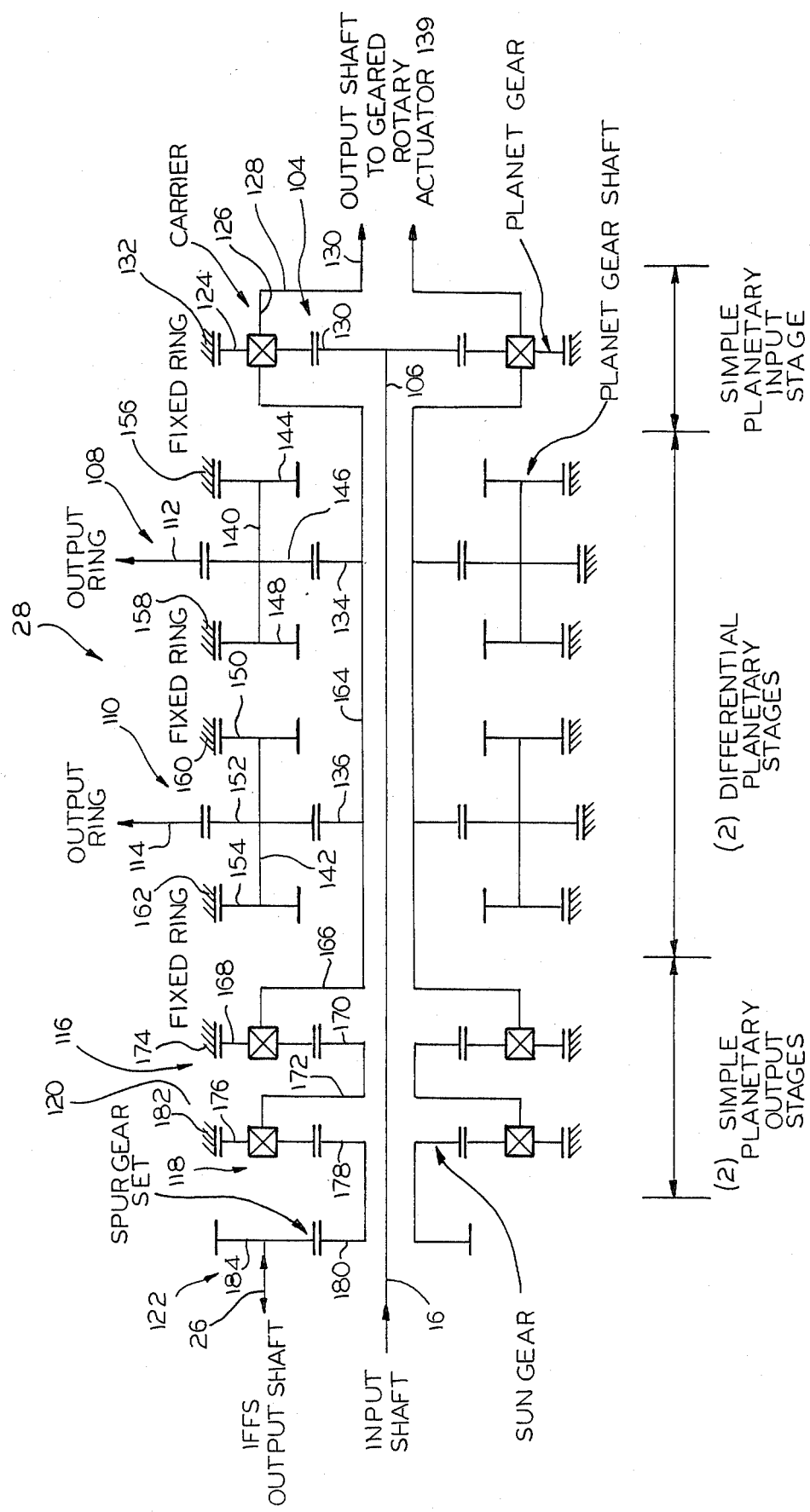
FIG. 3 is a schematic diagram of another geared rotary actuator for use in an actuation system of the type illustrated in FIG. 1.

Referring to FIG. 3, the geared rotary actuator 28 comprising the second actuator means is schematically illustrated. It includes a simple planetary input stage 104 at an end 106 thereof joined through the input shaft or torque tube 16 to the geared rotary actuator 18 comprising the first actuator means. Also, a pair of differential planetary stages 108 and 110 are disposed between the simple planetary input stage 104 and the feedback shaft 26.

Still referring to FIG. 3, the differential planetary stages 108 and 110 each include one of the multiple output stages 30 and 32 of the second actuator means or geared rotary actuator 28. For this purpose, the differential planetary stages 108 and 110 each include an integral mounting lug/output ring gear 112 and 114, respectively, which are operatively associated with the other of the control surfaces 34, as illustrated in FIG. 1. Referring again to FIG. 3, the geared rotary actuator 28 comprising the second actuator means further includes a pair of simple planetary output stages 116 and 118 at an end 120 thereof joined to the feedback shaft 26.

As shown, the pair of differential planetary stages 108 and 110 are actually disposed between the simple planetary input stage 104 and the pair of simple planetary output stages 116 and 118. It will also be seen that the feedback shaft 26 is joined to the outermost of the simple planetary output stages 118 by means of a spur gear set 122. As a result, the geared rotary actuator 28 consists of the simple planetary input stage 104, the pair of differential planetary stages 108 and 110, the pair of simple planetary output stages 116 and 118, and the spur gear set 122.

With this construction, the simple planetary input stage 104 preferably includes three planet gears, such as 124, mounted on needle bearings supported by through shafts, such as 126, pressed into a carrier such as 128. The planet gears, such as 124, react with a sun gear 130 integral with the input shaft or torque tube 16 and with a fixed ring gear 132. As will be appreciated, the force reaction upon the planet gears, such as 124, permits a torque output of the carrier 128 which, in turn, transmits torque to the two sungears 134 and 136 of the differential planetary stages 108 and 110 and to the output shaft 130 that is connected to another geared rotary actuator 139 comprising a third actuator means (see FIG. 1).

Referring again to FIG. 3, the differential planetary stages 108 and 110 each prferably include six planet gear shafts, such as 140 and 142, each preferably having three gears, such as 144, 146, 148 and 150, 152, 154, cut on the respective shafts 140 and 142. It will also be appreciated by those skilled in the art that the six planet gear shafts, such as 140 and 142, will be supported by two support rings (conventional and therefore not shown) situated between the center 146 and 152 and outer planet gear meshes 144, 148 and 150, 154 to hold the planet gears 144, 148 and 150, 154 closely in mesh with the respective fixed ring gears 156, 158 and 160, 162 to thereby allow control of actuator output backlash. As a result, the outer planet gears, such as 144, 148 and 150, 154, mesh with the fixed ring gears 156, 158 and 160, 162 and the center planet gears, such as 146 and 152, mesh with the sun gears 134 and 136 and the integral mounting lug/output ring gears 112 and 114 attached to the control surface or flap panel 34.

Still referring to FIG. 3, the simple planetary output stages 116 and 118 and the spur gear set 122 have been incorporated to step up the speed of the feedback shaft 26 from, e.g., 600 rpm to 5,500 rpm. This permits a lighter weight design for the feedback shaft which is preferably flexible and inherently transmits less torque at higher speeds relative to torque tube shafting. As will be appreciated, this is accomplished by means of the sun gear shaft 164 of the differential planetary stages 108 and 110 driving a carrier 166.

With this construction, the simple planetary output stages 116 and 118 operate by reason of the carrier 166 being driven by the sun gear shaft 164 such that the planetary gears, such as 168, of the first simple planetary output stage 116 react with a sun gear 170 integral with an adjacent carrier 172 and react with a fixed ring gear 174, as shown in FIG. 3. The torque reaction upon the adjacent carrier 172 causes the planet gears, such as 176, of the second simple planetary output stage 118 to react with a sun gear 178 integral with a spur gear 180 concentric with the input shaft or torque tube 16 and to react with a fixed ring gear 182 with torque then being transmitted from the spur gear 180 to another spur gear 184 attached to the feedback shaft 26.

With this construction, almost every shaft failure will result in the output stages of the actuators being held in position by another load path. The potential shaft failures include the input shaft or torque tube, the sun gears, the carrier of the simple planetary stages and the shaft of the sun gears of the differential planetary stages. As a result, the present invention represents a significant advancement in actuator systems for control surfaces of aircraft.

Referring once again to FIG. 1, the geared rotary actuator 139 comprising the third actuator means is preferably disposed at the end of the input shaft or torque tube 16 remote from the power drive unit 12. It will be appreciated that the geared rotary actuator 139 includes an output stage 186 driven by the power drive unit 12 through the input shaft or torque tube 16, and the output stage 186 is operatively associated with the outer one 34 of the pair of control surfaces 24 and 34 for driving movement thereof. Moreover, as shown, the feedback shaft 26 extends from the power drive unit 12 to the geared rotary actuator 28 comprising the second actuator means in operatively associated relation therewith.

Still referring to FIG. 1, the actuation system 10 preferably includes an electronic controller 188a for the power drive unit 12 and an electronic controller 188b for a power drive unit 189. It will be appreciated, of course, that an identical actuation system is preferably provided for control surfaces such as the leading edge flaps on the other side of an aircraft, as illustrated, and the two power drive units 12 and 189 for the two systems can then be linked by means of an interconnect flexible drive shaft 190. Moreover, as shown, a similar pair of power drive units 192 and 194 with associated geared rotary actuators (not shown) can be provided to operate control surfaces in the form of trailing edge flaps (not shown) by means of electronic controllers such as 196a and 196b.

While in the foregoing there has been set forth a preferred embodiment of the invention, it is to be understood that the invention is only to be limited by the spirit and scope of the appended claims.

We claim:

1. An actuator system for a movable surface, comprising:
   a power drive unit connected to one end of an input shaft, said input shaft defining a portion of a first load path between said power drive unit and said movable surface;
   single actuator means disposed on said input shaft for driving movement by said power drive unit, actuator means having multiple output stages operatively associated with said surface for driving movement thereof;
   a feedback shaft extending from said actuator means to said power drive unit, said feedback shaft defining a portion of a second load path between said power drive unit and said movable surface, said feedback shaft normally being subjected to a nominal torque, said feedback shaft being subjected to a detectable increased torque in the event of a failure in said input shaft or said actuator means; and
   torque sensing means operatively associated with said feedback shaft and integrally associated with said power drive unit, said feedback shaft being joined to said power drive unit such that said torque sensing means is capable of detecting said increased torque;
   said multiple output stages normally being driven by said power drive unit through said input shaft along said first load path, at least one of said multiple output stages being driven by said feedback shaft along said second load path in the event of a failure along said first load path, said torque sensing means causing said at least one of said multiple output stages to be driven by said feedback shaft upon detecting said increasing torque.

2. The actuator system as defined by claim 1 wherein said input shaft is a torque tube and said actuator means is a geared rotary actuator, said multiple output stages of said geared rotary actuator normally being driven by said power drive unit through said torque tube.

3. An actuator system for a pair of control surfaces for an aircraft, comprising:
   a power drive unit having an input shaft and a feedback shaft extending therefrom, said power drive unit including means integral therewith for sensing torque in said feedback shaft, said input shaft defining a portion of a first load path between said power drive unit and said control surfaces, said feedback shaft defining a portion of a second load path between said power drive unit and said control surfaces;
   first actuator means disposed along said input shaft for driving movement by said power drive unit, said first actuator means having multiple output stages operatively associated with one of said control surfaces for driving movement thereof; and
   second actuator means disposed along said input shaft for driving movement by said power drive unit, said second actuator means having multiple output stages operatively associated with one of said control surfaces for driving movement thereof;
   said feedback shaft extending to said second actuator means and being operatively associated therewith, said feedback shaft normally being subjected to a nominal torque, said feedback shaft being subjected to a detectable increased torque in the event of a failure in said input shaft or said first or second actuator means, said increased torque being indicative of said failure, said feedback shaft being joined to said power drive unit through said torque sensing means, said torque sensing means being capable of detecting said increased torque indicative of said failure;
   said multiple output stages of said first and second acutator means normally being driven by said power drive unit through said input shaft along said first load path, at least one of said multiple output stages of said first and second actuator means being driven by said feedback shaft along said second load path in the event of a failure along said first load path, said torque sensing means causing said at least one of said multiple output stages to be driven by said feedback shaft upon detecting said increased torque.

4. The actuator system as defined by claim 3 wherein said input shaft is a torque tube and said first and second actuator means are geared rotary actuators, said multiple output stages of said geared rotary actuators normally being driven by said power driven unit through said torque tube.

5. The actuator system as defined by claim 4 wherein said geared rotary actuator comprising said first actuator means includes a simple planetary input stage at an end thereof joined to said power drive unit and a simple planetary output stage at an end thereof joined to said geared rotary actuator comprising said second actuator means.

6. The actuator system as defined by claim 5 including a pair of differential planetary stages disposed between said simple planetary input and output stages, each of said differential planetary stages comprising one of said multiple output stages of said first actuator means, said differential planetary stages each including an output gear operatively associated with the one of said control surfaces.

7. The actuator system as defined by claim 6 including a torque limiter disposed at each end of said geared rotary actuator comprising said first actuator means, said torque limiter being adapted to limit torque transmitted through said torque tube and being grounded to said aircraft through said geared rotary actuator.

8. The actuator system as defined by claim 4 wherein said geared rotary actuator comprising said second actuator means includes a simple planetary input stage at an end thereof joined through said torque tube to said geared rotary actuator comprising said first actuator means.

9. The actuator system as defined by claim 8 including a pair of differential planetary stages disposed between said simple planetary input stage and said feedback shaft, each of said differential planetary stages comprising one of said multiple output stages of said second actuator means, said differential planetary stages each including an output gear operatively associated with the other of said control surfaces.

10. The actuator system as defined by claim 9 including a pair of simple planetary output stages at an end thereof joined to said feedback shaft, said pair of differential planetary stages being disposed between said simple planetary input stage and said pair of simple planetary output stages, said feedback shaft being joined to the outermost of said simple planetary output stages by a spur gear set.

11. An actuator system for an adjacent pair of control surfaces for an aircraft, comprising:
  a power drive unit having an input shaft and a feedback shaft extending therefrom said power drive unit including means integral therewith for sensing torque in said feedback shaft;
  first and second actuator means disposed along said input shaft in spaced relation, each of said first and second actuator means having multiple output stages normally driven by said power drive unit through said input shaft, said first actuator means being disposed inwardly of said second actuator means;
  said multiple output stages of said first actuator means being operatively associated with the inner one of said pair of control surfaces for driving movement thereof, said multiple output stages of said second actuator means being operatively associated with the outer one of said pair of control surfaces for driving movement thereof; and
  third actuator means disposed at the end of said input shaft remote from said power drive unit, said third actuator means having an output stage driven by said power drive unit through said input shaft, said output stage being operatively associated with the outer one of said pair of control surfaces for driving movement thereof;
  said feedback shaft extending to said second actuator means and being operatively associated therewith.

12. The actuator system as defined by claim 11 wherein said input shaft is a torque tube and said first and second actuator means are geared rotary actuators, said multiple output stages of said geared rotary actuators normally being driven by said power drive unit through said torque tube, said third actuator means also comprising a geared rotary actuator having said output stage driven by said power drive unit through said torque tube.

13. The actuator system as defined by claim 12 wherein said feedback shaft is normally subjected to a nominal torque, said feedback shaft being subjected to a detectable increased torque in the event of a failure in said input shaft or said first or second actuator means, said increased torque being indicative of said failure, said feedback shaft being joined to said power drive unit through said torque sensing means, said torque sensing means being capable of detecting said increased torque indicative of said failure.

14. The actuator system as defined by claim 12 wherein said geared rotary actuator comprising said first actuator means includes a simple planetary input stage at an end thereof joined to said power drive unit and a simple planetary output stage at an end thereof joined to said geared rotary actuator comprising said second actuator means, and including a pair of differential planetary stages disposed between said simple planetary input and output stages, each of said differential planetary stages comprising one of said multiple output stages of said first actuator means, said differential planetary stages each including an output gear operatively associated with one of said control surfaces, and including a torque limiter disposed at each end of said geared rotary actuator comprising said first actuator means, said torque limiters being adapted to limit torque transmitted through said torque tube, said torque limiters being grounded to said aircraft through said geared rotary, actuator.

15. The actuator system as defined by claim 14 wherein said geared rotary actuator comprising said second actuator means includes a simple planetary input stage at an end thereof joined through said torque tube to said geared rotary actuator comprising said first actuator means, and including a pair of differential planetary stages disposed between said simple planetary input stage and said feedback shaft, each of said differential planetary stages comprising one of said multiple output stages of said second actuator means, said differential planetary stages each including an output gear operatively associated with the other of said control surfaces, and including a pair of simple planetary output stages at an end thereof joined to said feedback shaft, said pair of differential planetary stages being disposed between said simple planetary input stage and said pair of simple planetary output stages, said feedback shaft being joined to the outermost of said simple planetary output stages by a spur gear set.

16. The actuator system as defined by claim 15 wherein said geared rotary actuator comprising said second actuator means is joined at said simple planetary input stage thereof through said torque tube to said geared rotary actuator comprising said third actuator means.

* * * * *